(12) United States Patent
Reyes et al.

(10) Patent No.: US 11,590,812 B2
(45) Date of Patent: Feb. 28, 2023

(54) SYSTEM AND METHOD FOR CONNECTING TRAILER TOWING COMPONENTS (71) Applicant: Bil-Jax, Inc., Archbold, OH (US)

(72) Inventors: Robert Warren Reyes, Maumee, OH (US); Keith Raymond Bruner, Wauseon, OH (US); Brice Melvin Knick-Koppenhofer, Holgate, OH (US)

(73) Assignee: Bil-Jax, Inc., Archbold, OH (US)

( * ) Notice: Subject to any disclaimer, the term of this patent is extended or adjusted under 35 U.S.C. 154(b) by 35 days.

(21) Appl. No.: 17/445,425

(22) Filed: Aug. 19, 2021

(65) Prior Publication Data
US 2022/0055428 A1 Feb. 24, 2022

Related U.S. Application Data (60) Provisional application No. 63/068,532, filed on Aug. 21, 2020.

(51) Int. Cl.
*B60D 1/155* (2006.01)
(52) U.S. Cl.
CPC ................... *B60D 1/155* (2013.01)
(58) Field of Classification Search
CPC ............... B60D 1/145; B60D 1/155
See application file for complete search history.

(56) References Cited

U.S. PATENT DOCUMENTS

| | | | |
|---|---|---|---|
| 3,797,846 A * | 3/1974 | Pevic | B60D 1/143 280/493 |
| 4,281,847 A | 8/1981 | Robe | |
| 4,978,133 A | 12/1990 | Thorne et al. | |
| 5,823,560 A | 10/1998 | Van Vleet | |
| 6,220,618 B1 | 4/2001 | Smith et al. | |
| 6,283,490 B1 * | 9/2001 | Sciannanteno | B60D 1/155 280/493 |
| 6,286,853 B1 * | 9/2001 | Lauzon | B60D 1/155 280/491.1 |
| 6,485,046 B1 | 11/2002 | Hsueh et al. | |
| 6,581,953 B2 | 6/2003 | Jerry | |
| 6,834,879 B1 | 12/2004 | Lorman | |
| 6,957,826 B1 * | 10/2005 | MacKarvich | B60D 1/155 280/491.3 |
| 9,505,281 B1 | 11/2016 | Borkholder | |
| 9,764,613 B2 | 9/2017 | Rowe et al. | |
| 10,352,394 B2 | 7/2019 | Karpenko et al. | |
| 10,378,418 B2 | 8/2019 | Rodecker | |
| 10,493,811 B2 | 12/2019 | Borkholder | |

(Continued)

FOREIGN PATENT DOCUMENTS

WO WO-9411210 A1 * 5/1994 ........... B60G 11/184

*Primary Examiner* — Kevin Hurley
(74) *Attorney, Agent, or Firm* — Marshall & Melhorn, LLC (57) ABSTRACT A system for connecting trailer towing components may have a pin having a first leg and a second leg. The system may also have a torsion bar having a first set of splines, and a main beam for a trailer. The main beam may have an insert adapted to selectively receive the torsion bar therein. The main beam may also have at least one guide aperture adapted to selectively receive one of the pin legs. The system may also have a secondary beam adapted to be selectively located at least partially within the main beam. The secondary beam may have apertures adapted to receive at least one of the legs of the pin and the torsion bar.

18 Claims, 5 Drawing Sheets

(56) References Cited

U.S. PATENT DOCUMENTS

| | | |
|---|---|---|
| 2003/0214116 A1 | 11/2003 | Rehme |
| 2005/0263984 A1 | 12/2005 | Gurtler |
| 2006/0097483 A1 | 5/2006 | White |
| 2019/0277330 A1 | 9/2019 | Pattok et al. |

* cited by examiner

SYSTEM AND METHOD FOR CONNECTING TRAILER TOWING COMPONENTS

FIELD

Described herein is a system and method for connecting trailer towing components.

BACKGROUND

Trailers that are towed behind vehicles are well-known, and they are adapted for many different purposes. In many cases, the trailers have one or more members extending from, or comprising, a frame that extends toward a hitch (or similar device) on the vehicle that connects the trailer to the vehicle. The vehicles the trailers are connected to are often designed to withstand greater loads and may have better and more sophisticated suspension systems compared with the trailers. Many times vehicle operators drive their vehicles pulling a trailer in the same manner as if the trailer was not attached. In some cases, this results in the trailer experiencing high loads on many components. For example, the trailer members at or adjacent to the trailer/vehicle connection may be put under high torsional, lateral and/or longitudinal loads while the trailer is towed. These high loads may lead to premature fatigue and/or failure of the members.

Some attempts in the prior art exist that are designed to accommodate the loads experienced by these components. The prior art designs, however, are often complex, heavy and costly. The complexity of the prior art systems leads to additional failure modes. Further, the weight of the prior art systems decreases fuel economy of the towing vehicle and makes the trailer more difficult to manage. Additionally, the cost of the prior art systems often makes them prohibitive to consumers.

In view of the problems with the prior art, it would be advantageous to provide a system for connecting trailer towing components together that is capable of withstanding the various loads experienced by components. It would also be advantageous for the system to be lightweight and simple. The simple nature of the design reduces failure modes, makes it easy to manufacture and repair and keeps the overall cost low. Further, the lightweight nature of the system will make it easier to maneuver the trailer, as well as reduce fuel consumption of the towing vehicle.

SUMMARY

In one aspect, a system for connecting trailer towing components may have a pin having a first leg and a second leg. The system may also have a torsion bar having a first set of splines. The system may also have a main beam for a trailer. The main beam may have an insert adapted to selectively receive the torsion bar, and at least one guide aperture adapted to selectively receive one of the pin legs. The system may also have a secondary beam adapted to be selectively located at least partially within the main beam. The secondary beam may have apertures adapted to receive at least one of the legs of the pin and the torsion bar.

In another aspect, the pin may be U-shaped with a central member connecting the first and second legs in a unitary, one-piece and integrally formed fashion.

In another aspect, the ends of the first and second legs of the pin are threaded, and the pin may have a generally circular cross-section.

In another aspect, the first and second legs of the pin may be located through apertures in a retention plate, and fasteners may be secured to the threaded ends of the first and second legs to secure the plate the legs.

In another aspect, the first and second legs of the pin may be located through the at least one guide aperture and the secondary beam apertures that may be aligned in the main beam and the secondary beam when the secondary beam is located at least partially within the main beam to selectively connect the main beam to the secondary beam.

In another aspect, one of the at least one guide apertures in the main beam may be a slot extending transverse a longitudinal direction of the beam, where one of the pin legs may be adapted to vertically translate within the slot.

In another aspect, a first end portion of the torsion bar may have the first plurality of splines extending at least partially circumferentially about the first end portion, and a second end portion may have a key having a non-cylindrical shape.

In another aspect, the insert may have a second plurality of splines adapted to mesh with the first plurality of splines of the torsion bar, where the second plurality of splines may extend at least partially on an inner circumference of the insert.

In another aspect, the key on the torsion bar may be adapted to be located in an aperture with a complementary shape to prevent rotation of the torsion bar within the aperture.

In another aspect, an aperture in the torsion bar may be adapted to be aligned with an aperture in the insert, where a bushing pin may be located through the insert aperture and into the torsion bar aperture to selectively secure them together.

In another aspect, the main beam may have a hollow interior portion adapted to receive the secondary beam such that the main beam entirely surrounds a portion of the secondary beam located therein.

In another aspect, an aperture in the main beam may be slot shaped and an aperture in the secondary beam adapted to align with the slot shaped aperture is round.

In another aspect, an aperture in the secondary beam adapted to receive a leg of the pin may be located outside of the main beam when the secondary beam is located within the main beam.

In another aspect, at least one ferrule may be located about at least one leg of the pin.

In another aspect, the torsion bar may extend entirely through the main beam and the secondary beam when the secondary beam is located at least partially within the main beam.

In another aspect, the first leg of the pin extends entirely through both of the beams when the secondary beam is located at least partially within the main beam, and the second leg of the pin only extends entirely through the secondary beam when the secondary beam is located at least partially within the main beam.

In another aspect, a system for connecting trailer towing components may have a main beam for a trailer having first and second guide apertures, and a hollow interior portion. The first guide aperture may be adapted to receive an insert therein. The insert may have a first plurality of splines, where the second guide aperture may be a slot. The system may also have a secondary beam adapted to be selectively located within the hollow interior portion of the main beam. The secondary beam may have first, second and third guide apertures therein. The system may also have a U-shaped pin having first and second legs, wherein the first leg may be adapted to be selectively located in the slot of the main beam and also into the first guide aperture of the secondary beam. The second leg may be adapted to be selectively located in the third guide aperture of the secondary beam to secure the main beam to the secondary beam. The system may also have a torsion bar with a second set of splines that selectively engage with the first plurality of splines. The torsion bar may be adapted to be selectively located in the second guide aperture of the secondary beam to secure the main beam to the secondary beam.

In another aspect, a system for connecting trailer towing components may have a pin having a first leg and a second leg. The system may also have a torsion bar having a first set of splines. The system may also have a main beam for a trailer wherein the main beam may be adapted to selectively receive the torsion bar therein. The main beam has at least one guide aperture adapted to selectively receive one of the pin legs therein. The system may also have a secondary beam adapted to be selectively located at least partially within the main beam. The secondary beam may have apertures adapted to receive at least one of the legs of the pin and the torsion bar.

BRIEF DESCRIPTION OF THE DRAWINGS

The device and method of using the same will become readily apparent to those skilled in the art from the following detailed description when considered in the light of the accompanying drawings in which.

DETAILED DESCRIPTION OF THE PREFERRED EMBODIMENTS

It is to be understood that the device and method may assume various alternative orientations and step sequences, except where expressly specified to the contrary. It is also to be understood that the specific devices and methods illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Figures 1, 2:
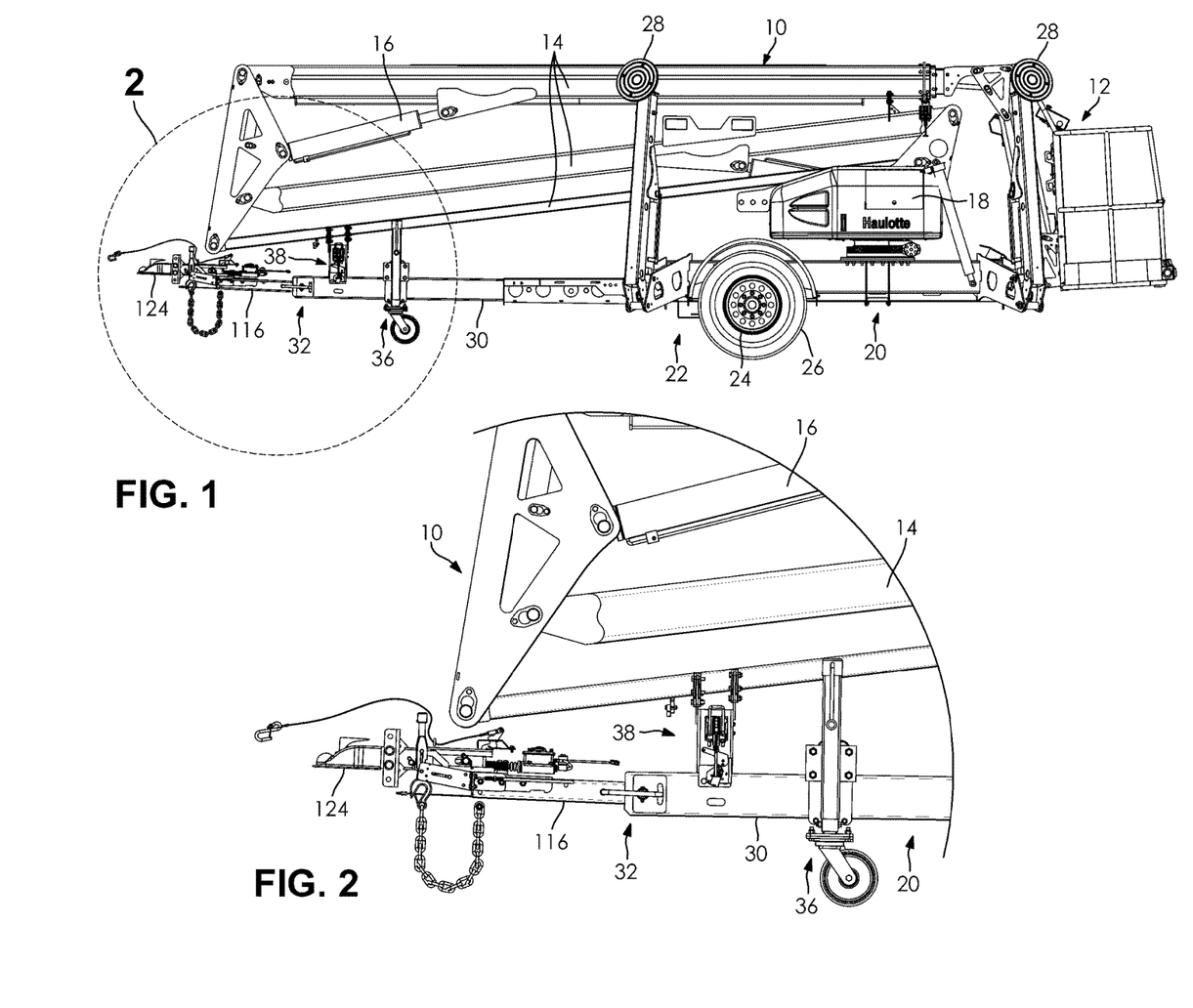
FIG. 1 is a side view of one embodiment of a trailer.
FIG. 2 is a side view of a portion of the trailer depicted in FIG. 1.
Figure 3:
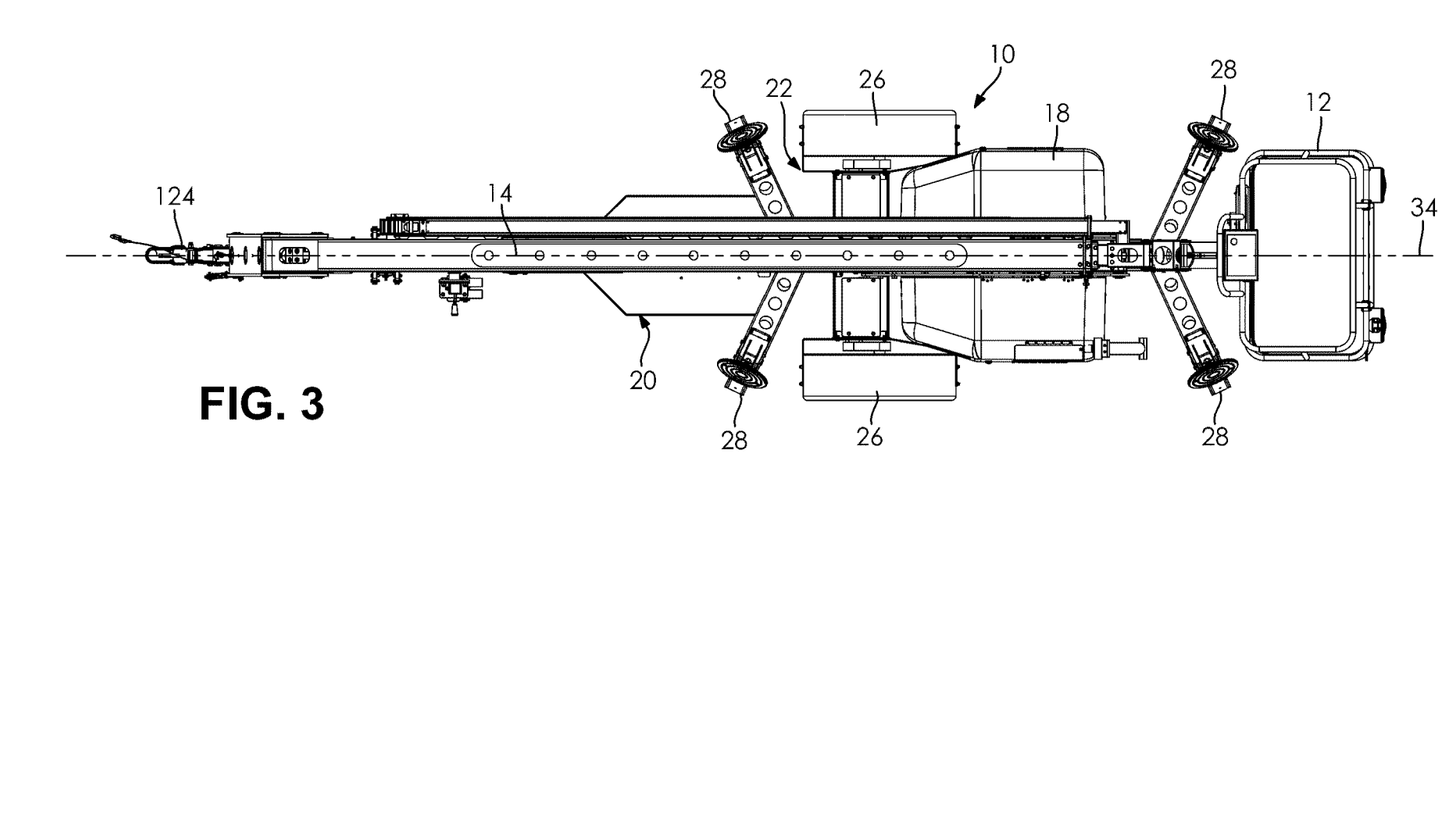
FIG. 3 is a top view of the trailer depicted in FIG. 1.

Turning now to FIGS. 1-3, one embodiment of a trailer 10 adapted to be towed behind a vehicle (not shown) is depicted. In the depicted embodiment, the trailer 10 may be such as to support an aerial work platform 12. An aerial work platform 12 is a platform capable of supporting one or more workers thereon and which is also capable of being selectively elevated off the ground. In this embodiment, the aerial work platform 12 is located on the trailer 10.

While one embodiment of a trailer 10 is depicted and described herein for exemplary purposes, the system is not limited for use with just the depicted trailer 10. Instead, trailers 10 of different sizes, shapes, orientations and purposes may be used. Other related towable devices include lifts of various designs including vertical masts, scissor lifts, and telehandlers, as well as other general devices and machinery adapted to be towed.

The platform 12 may be connected to the trailer 10 such as by articulated and/or telescopic booms 14. The booms 14 may be provided with fluid driven devices, such as hydraulically driven pistons 16, that may be selectively engaged and disengaged to move the booms 14 in at least a vertical direction. Hydraulic power may be provided to the pistons such as through a power source, including an electric motor or internal combustion engine, connected to a fluid pump. The fluid pump is connected to the pistons to selectively provide fluid power thereto. The power source and fluid pumps may be located in a housing 18 located on the trailer 10.

The trailer 10 may have a frame 20 that supports the aerial work platform 12 as well as the booms 14. The frame 20 may be comprised of one or more members that are connected together.

The trailer 10 may also have an axle system 22 with at least one wheel 24 and tire 26 on each end of the axle system 22. The axle system 22 may be connected to the frame 20 to support the axle system 22 thereon. The axle system 22 may be located on the frame 20 at or near the center of gravity of the trailer 10 to help evenly support the trailer load thereon.

While a single axle system 22 is depicted with a single wheel 24 and tire 26 on each end, other axle systems may also be used. These systems may include multi-axle systems and/or with multiple wheel/tire combinations on each end of the axle system.

The trailer 10 may also have one or more outriggers 28 attached thereto. The outriggers 28 may be connected to the trailer 10 in such a way that they may be selectively retracted and extended. In the extended orientation, the outriggers 28 may provide stabilizing support to the trailer 10 as such support may be needed when, by way of example, the aerial work platform 12 is deployed. From FIG. 3 it can be seen that four outriggers 28 in the retracted, or travel, position are provided. A trailer 10 may or may not have such outriggers 28 attached, they may be in greater or fewer numbers and they may be of various sizes and shapes.

Figures 4, 5:
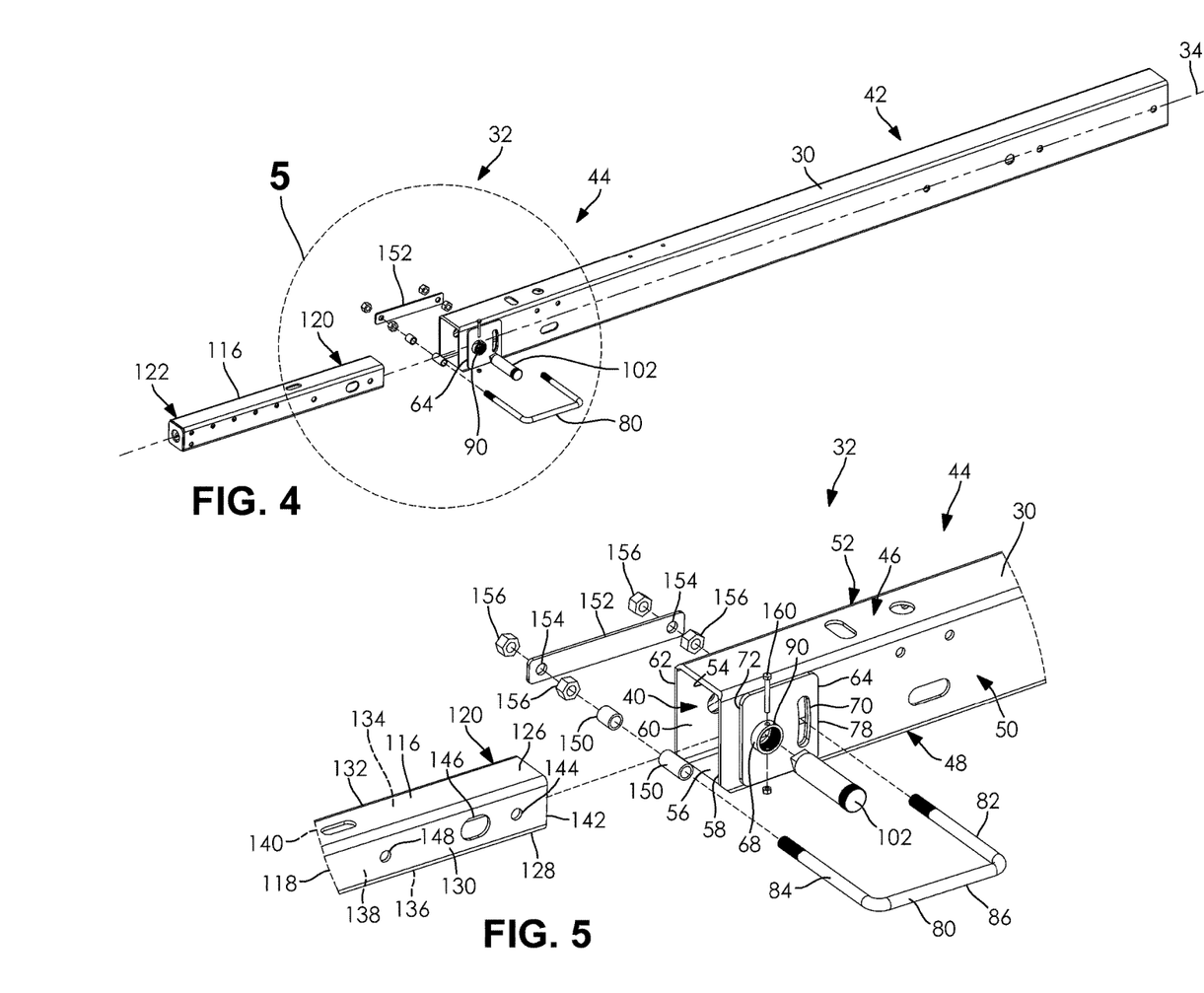
FIG. 4 is a perspective view of components from FIG. 1.
FIG. 5 is an exploded perspective view of the components from FIG. 4.

Looking now at FIGS. 3 and 4, a portion of the exemplary frame 20 is depicted. In this embodiment, a portion of the frame 20 extending away from the axle system 22 is schematically shown. As can be appreciated from these figures, the portion of the frame 20 in this area of the trailer 10 may be a single member or beam. This feature will be designated as a main beam 30 herein. The main beam 30 may be part of a system 32 for connecting trailer towing components. The main beam 30 may extend along a longitudinal axis 34 of the trailer 10; the main beam 30 may stop before it reaches the axle system 22.

The main beam 30 may have various structures attached thereto. For example, the main beam 30 may have a castor-type wheel 36 for supporting the trailer 10 on the ground when the trailer 10 is not connected to a vehicle. The main beam 30 may also have a cradle 38 for supporting one of the boom 14 members, or an associated structure, thereon. The present system 32, however, does not require either one of these devices; further, if present, these devices may be of different size, shape and/or location than shown in the figures. In view of the above, the castor-type wheel 36 and the cradle 38 are not part of the system 32.

The main beam 30 may be comprised of a metallic, such as steel, length of material. The main beam 30 may be unitary, one-piece and continuous in its construction. In one embodiment the main beam 30 may have a square cross-section with a hollow interior 40. While one cross-section shape is mentioned herein, other cross-sections may be permissible.

The main beam 30 may have an inboard end portion 42 and an outboard end portion 44. The inboard end portion 42 may be the portion that is connected to the rest of the frame 20 and trailer 10 while the outboard end portion 44 is the portion that carries the structure to connect to the towing vehicle. The terms inboard and outboard may relate to the longitudinal, axial direction associated with the trailer 10. The inboard direction is directionally opposite the outboard direction.

The outboard end portion 44 of the main beam 30, having a square cross-section, may have an exterior upper surface 46, an exterior lower surface 48 parallel the upper surface 46 and exterior first and second side surfaces 50, 52 that are parallel one another and which extend transverse the exterior upper and lower surfaces 46, 48. Being hollow, the outboard end portion 44 also defines an interior upper surface 54, an interior lower surface 56 and two interior first and second side surfaces 58, 60. The interior surfaces 54, 56, 58, 60 are parallel their respective exterior surfaces 46, 48, 50, 52 and a constant material thickness separates them. The interior surfaces 54, 56, 58, 60 also define the hollow interior 40 of the outboard end portion 44.

The outboard end portion 44 also contains a terminus 62 of the main beam 30. Preferably, the terminus 62 is open providing access to the hollow interior 40.

As can be appreciated from FIGS. 4, 5, 6, 9 and 11, adjacent the terminus 62 of the main beam 30 in the outboard end portion 44, a first side plate 64 and a second side plate 66 may be attached to each exterior first and second side surface 50, 52. In an alternative embodiment, no side plates are attached to the first or second side surfaces 50, 52.

The first and second side plates 64, 66 may be secured to the exterior first and second side surfaces 50, 52 such as through welding and/or mechanical-type fasteners. The side plates 64, 66 may have a height that is the same or similar to the height of the side surfaces 50, 52. The side plates 64, 66, however, only extend along a portion of the length of the side surfaces 50, 52. In the depicted embodiment, the side plates 64, 66 may have square perimeters that define the boundaries of the side plates 64, 66.

In some embodiments, the side plates 64, 66 may be offset from the terminus 62 of the main beam 30 by a predetermined distance, or the side plates 64, 66 may be aligned with the terminus 62 of the main beam 30.

Figure 9:
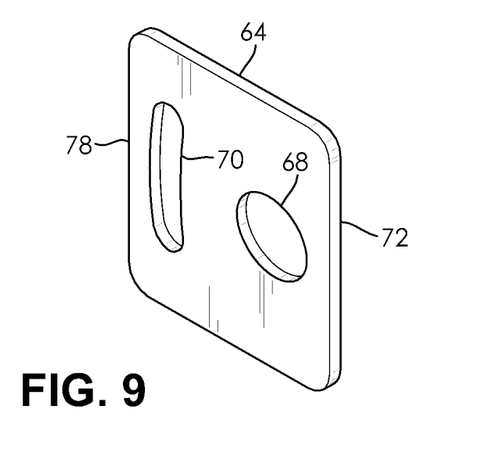
FIG. 9 is a perspective view of a component from FIGS. 4 and 5.
Figure 11:
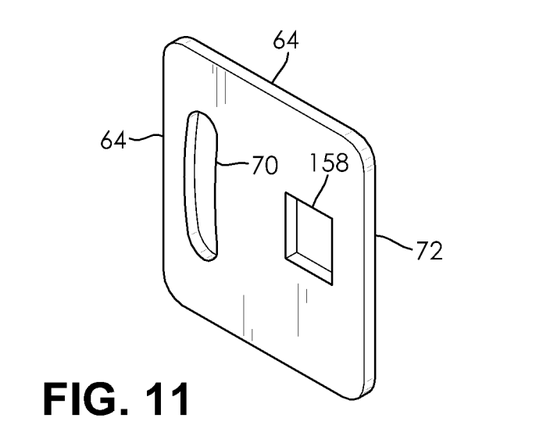
FIG. 11 is a perspective view of a component from FIGS. 4 and 5.

The side plates 64, 66 may have substantially planar first and second sides, which define a substantially constant thickness between them. One embodiment of one of the plates 64, 66 is shown in FIGS. 9 and 11.

The side plates 64, 66 may reinforce the main beam 30. In addition, the side plates 64, 66 may provide guide apertures for additional parts of the system 32 some of which are described below.

In one embodiment, each plate 64, 66 may be provided with two guide apertures. The first guide aperture 68 in the first side plate 64 may be vertically centered, but offset toward a front edge 72 of a plate 64, 66. The first guide aperture 68 may be circular in shape, and it may be sized to at least accommodate a torsion bar therein (described below).

The first guide aperture 74 in the second side plate 66 shares a common axis with the first guide aperture 68 in the first side plate 66. The first guide aperture 74 in the second plate 66, however, may have a different shape compared with the first guide aperture 68 in the first side plate 64. In one embodiment, the first guide aperture 74 in the second side plate 66 may be rectangular or square in shape, as seen in FIG. 11.

In the same embodiment, each plate 64, 66 may also be provided with a second guide aperture 70, 76, respectively. The second guide aperture 70, 76 may be slot shaped. Further, the slot may be provided with a radius such that it slightly curves about the first guide aperture 68, 74. The radius may be constant across the slot. The width of the slot may be sufficient to accommodate a leg of a pin (described below) therein. The upper and lower ends of the slot may be curved as well. The radius of curvature for the upper and lower ends may at least partially match the circular cross-section of the pin.

The second guide apertures 70, 76 may be vertically positioned within the plates 64, 66, but they are offset from a rear edge 78, as well as the centers, of the plates 64, 66.

Figure 10:
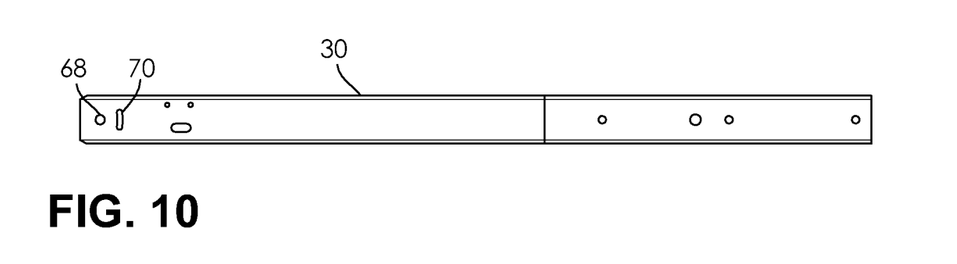
FIG. 10 is a side view of a component in FIGS. 4 and 5.

In an alternative embodiment depicted in FIG. 10, first and second side plates 64, 66 are not used. Instead, the above-described first and second guide apertures 68, 74, 70, 76 are located directly into the side walls of the main beam 30 at the same locations they would be as if the first and second side plates 64, 66 were installed thereon. The features described below may be used with these apertures just as if the apertures were located in the first and second side plates 64, 66.

The system 32 may also include a pin 80. The pin 80 may be constructed of metal, such as steel, and the pin 80 may be unitary, integrally formed and one-piece in its construction. The pin 80 may have a generally circular cross-section.

In one embodiment, as shown in FIG. 5, the pin 80 may be U-shaped. In this construction, the pin 80 may have first and second legs 82, 84 connected by a central member 86. The legs 82, 84 extend from opposite ends of the central member 86 in the same direction as one another, for the same distance as one another, and they are parallel and coplanar one another, as well as coplanar with the central member 86. The pin 80 may be symmetrical about the central member 86.

The legs 82, 84 have end portions 88 opposite where they connect with the central member 86. The end portions 88 may be threaded.

Figures 6, 7:
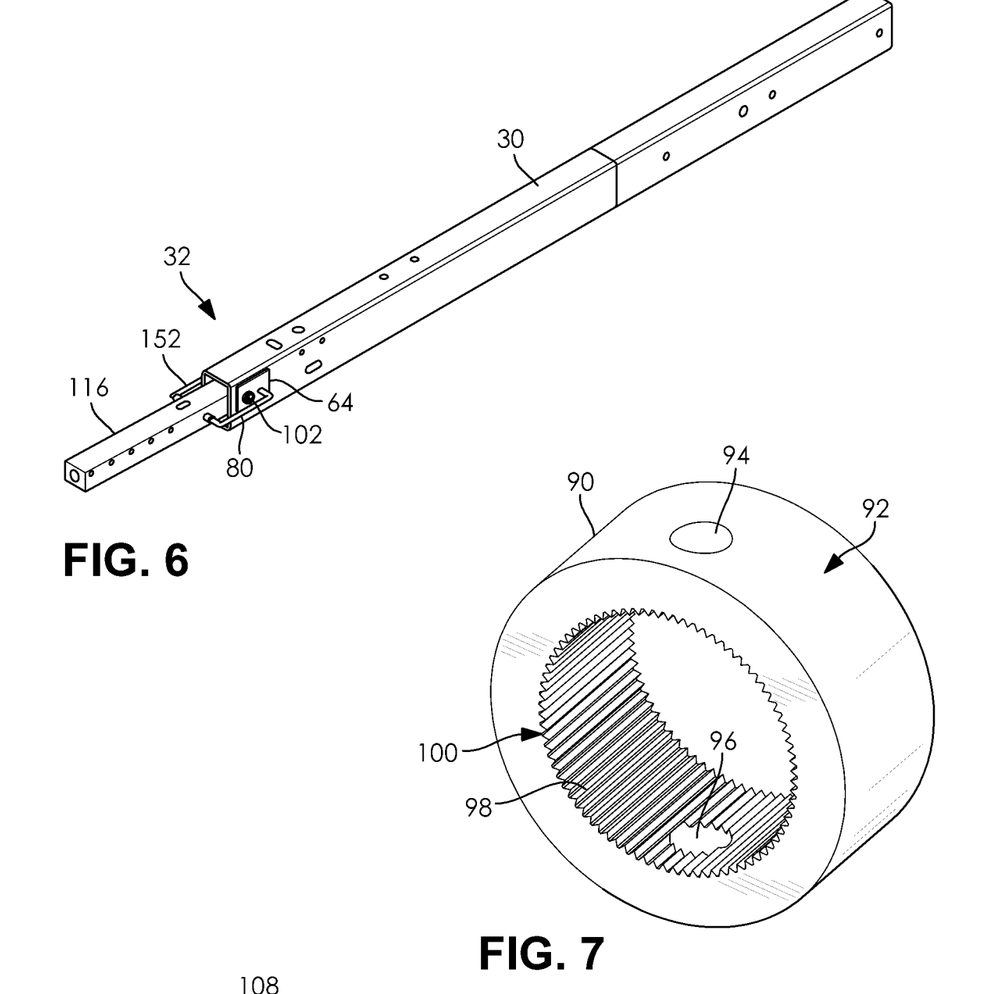
FIG. 6 is a perspective view of a component from FIG. 4.
FIG. 7 is a perspective view of a component from FIG. 4.

The system 32 may also include an insert 90. One embodiment of an insert 90 is depicted in FIGS. 4, 5 and 7. The insert 90 may have a generally tubular shape with a circular outer circumference 92. First and second aligned apertures 94, 96 may extend through the outer circumference 92 to an inner surface 98 of the insert 90. The inner surface 98 is defined by a first plurality of splines 100 circumferentially extending about the inner surface 98. The splines 100 extend transverse the direction of the aligned apertures 94, 96.

As shown in FIGS. 4 and 5, the insert 90 may be located within the first guide aperture 68, 74 in one of the side plates 64, 66. The insert 90 may be unitary, one piece and integrally formed with the side plate 64, 66 or the insert 90 may be located within the first guide aperture 68, 74 and then secured thereto, such as by welding and the like.

Figure 8:
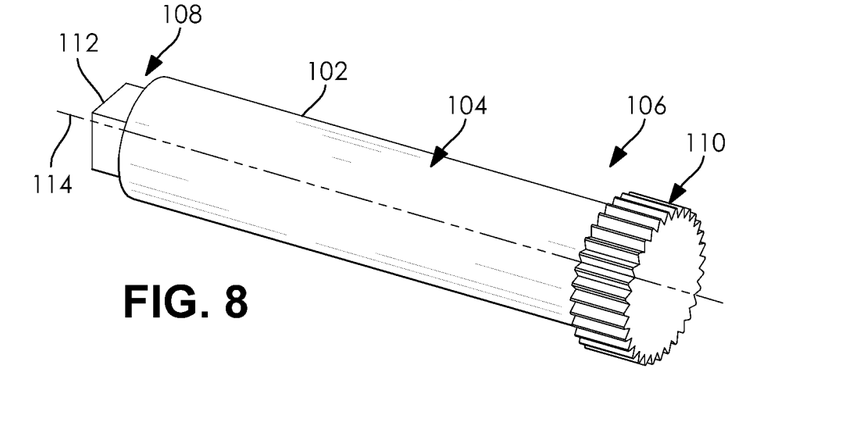
FIG. 8 is a perspective view of a component from FIG. 4.

The system 32 may also be comprised of a torsion bar 102, one embodiment of which is depicted in FIGS. 4, 5 and 8. The torsion bar 102 may be unitary, one piece and integrally formed of metal, such as steel. The torsion bar 102 may be comprised of a main body portion 104 with a first end portion 106 and a second end portion 108. The first end portion 106 may have a second plurality of splines 110 at least partially circumferentially extending about it. The splines 110 may have a size, shape and pattern that matches the size, shape and pattern of the first plurality of splines 100 on the insert 90.

Between the first end portion 106 and the second end portion 108, the main body portion 104 of the torsion bar 102 may be cylindrical in shape. The second end portion 108 of the main body portion 104 may have a key 112. The key 112 may have a square cross-section and it may extend along a longitudinal axis 114 of the torsion bar 102.

The system 32 may also be comprised of a secondary beam 116, which may be seen in FIGS. 4, 5 and 6. The secondary beam 116 may be comprised of a metallic, such as steel, length of material. The secondary beam 116 may be unitary, one-piece and integrally formed in its construction. In one embodiment, the secondary beam 116 may have a square cross-section with a hollow interior 118. While one cross-section shape is mentioned herein, other cross-sections may be permissible.

The secondary beam 116 may have an inboard end portion 120 and an outboard end portion 122. The inboard end portion 120 may be the portion that is connected to the main beam 30, while the outboard end portion 122 is the portion that carries the structure to connect to the towing vehicle. This structure may be such as the receiver that receives the ball stud, jaw or other structure on the towing vehicle. One embodiment of a receiver 124 is shown in FIGS. 1, 2 and 3.

The inboard end portion 120 of the secondary beam 116, having a square cross-section may have an exterior upper surface 126, an exterior lower surface 128 parallel the upper surface 126, and exterior first and second side surfaces 130, 132 that are parallel one another and which also extend transverse the exterior upper and lower surfaces 126, 128. Being hollow, the inboard end portion 120 also defines an interior upper surface 134, an interior lower surface 136 and two interior first and second side surfaces 138, 140. The interior surfaces 134, 136, 138, 140 are parallel their respective exterior surfaces 126, 128, 130, 132 and a constant material thickness separates them. The interior surfaces 134, 136, 138, 140 also define the hollow interior 118 of the inboard end portion 120.

The inboard end portion 120 also contains a terminus 142 of the secondary beam 116. Adjacent the terminus 142 of the secondary beam 116 two guide apertures may be located in each of the sides of the secondary beam. The first guide apertures 144 may be vertically centered in the side surfaces 130, 132, 138, 140, they may also be circular in shape. The first guide apertures 144 may also be sized to at least accommodate one of the legs 82, 84 of the pin 80 therein.

The second guide apertures 146 may be located outboard from the first guide apertures 144 in the secondary beam 116. The second guide apertures 146 may be circular in shape and they may be larger in diameter than the first guide apertures 144. The second guide apertures 146 should be large enough to accommodate the torsion bar 102 therein. The second guide apertures 146 are also vertically centered in the side walls 130, 132, 138, 140.

Third guide apertures 148 may be located outboard from the second guide apertures 146. In one embodiment, the third guide apertures 148 are located outboard from the first guide apertures 144 a distance equivalent to the length of central member 86 of the pin 80. The third guide apertures 148 may be vertically centered in the side walls 130, 132, 138, 140 and coplanar with the first guide apertures 144. The third guide apertures 148 may also have the same size and shape as the first guide apertures 144. Thus, the third guide apertures 148 may be sized to at least accommodate one of the legs 82, 84 of the pin 80 therein, preferably it is the second leg 84 of the pin 80 that is selectively located in the third guide apertures 148.

As mentioned above, the smaller inboard end portion 120 of the secondary beam 116 is sized and shaped to be selectively located within the larger outboard end portion 44 of the main beam 30 such that the larger outboard end portion 44 of the main beam 30 at least partially overlaps and encloses the inboard end portion 120 of the secondary beam 116. In an installed condition, the inboard end portion 120 of the secondary beam 116 may be centered in the outboard end portion 44 of the main beam 30. Thus, the exterior upper, lower and first and second side surfaces 126, 128, 130, 132 of the inboard end portion 120 of the secondary beam 116 may be equally spaced from the interior upper, lower and first and second side surfaces 54, 56, 58, 60 of the outboard end portion 44 of the main beam 30.

In the installed condition described above, certain guide apertures may be horizontally (aligned in the inboard/outboard direction) and vertically aligned with one another as can be appreciated in FIGS. 4 and 5. For example, the second guide apertures 70, 76 in the side plates 64, 66 on the main beam 30 may be vertically and horizontally aligned with the first guide apertures 144 in the secondary beam 116. Note that the second guide apertures 70, 76 in the side plates 64, 66 may be slot shaped thus in the installed condition the first guide apertures 144 in the secondary beam 116 maybe aligned anywhere along the slot of the second guide apertures 70, 76 in the side plates 64, 66. Preferably, the first guide apertures 144 in the secondary beam 116 are vertically and horizontally centered in the slots of the second guide apertures 70, 76. Further, in the same installed condition, the first guide apertures 68, 74 in the main beam 30 may be vertically and horizontally aligned with the second guide aperture 146 in the secondary beam 116. In the same embodiment, the third guide apertures 148 in the secondary beam 116 are not aligned with any guide apertures in the main beam 30; instead, the third guide apertures 148 in the secondary beam 116 are located outside of the main beam 30 and they are not enclosed thereby.

In one embodiment, the first leg 82 of the pin 80 is located through the second guide apertures 70, 76 in the side plates 64, 66 and also through first guide apertures 144 in the secondary beam 116 when the two beams 30, 116 are in the installed, or joined, condition. At the same time, the second leg 84 of the pin 80 is located through the third guide apertures 148 in the secondary beam 116. It can be appreciated that this joins the secondary beam 116 and the main beam 30 together.

In some embodiments, such as shown in FIG. 5, at least the second leg 84 of the pin 80 may also be located within one or more ferrules 150. While the figures for this embodiment only show ferrules 150 located on the second leg 84 of the pin 80, they may also be located on the first leg 82.

The ferrules 150 may be such as tubular structures with an inner diameter sufficient to accept the legs 82, 84 of the pin 80 therein. The ferrules 150 may be constructed of metal, such as steel, or any other resilient material. The ferrules 150 may be fixed in place or they may rotate relative to the pin leg 82, 84 and/or the guide apertures 68, 70, 74, 76, 144, 146, 148. The ferrules 150 are designed to prevent and/or reduce wear on the pin leg 82, 84 and the guide apertures 68, 70, 74, 76, 144, 146, 148 where these two features would contact one another without the ferrules 150. The ferrules 150 also provide additional material thickness at the intersection of the pin legs 82, 84 and the guide apertures 68, 70, 74, 76, 144, 146, 148 to increase robustness and strength of the intersection.

As also shown in FIG. 5, some embodiments may locate the threaded end portions 88 of the legs 82, 84 of the pin 80 through a shared retention plate 152. The retention plate 152 may be rectangularly shaped with two apertures 154 extending through the plate 152 at end portions thereof. The threaded end portions 88 of the legs 82, 84 may extend through the apertures 154 of the plate 152. Threaded nuts 156 may be located on the end portions 88 of the legs 82, 84 to secure the plate 152 to the legs 82, 84. FIGS. 4 and 5 show that the retention plate 152 is located on the opposite side of the beams 30, 116 from the connecting portion of the pin 80 when the two are installed on the beams 30, 116. The retention plate 152 prevents the pin 80 from being removed from the beams 30, 116.

It can be appreciated from FIGS. 4 and 5 that the pin 80 fixedly connects the main beam 30 with the secondary beam 116 in the axial or longitudinal (aka inboard/outboard) direction. The pin 80 is well adapted to accommodate the axial/longitudinal forces experienced when the trailer 10 is towed behind a vehicle while the vehicle traverses relatively flat terrain. Thus, the pin 80, including its legs 82, 84 and central member 86 are sized, shaped and constructed of a material sufficient to accommodate the axial/longitudinal forces associated with towing the trailer 10.

While one embodiment of a pin 80 is described, other structures with the same or related structures may be used. Such structures may include two rods in a parallel relationship connected by a plate. Similarly, the structures may be such as two rods connected to one another via flexible member, such as a chain and/or cable. The rods may be such as bolts or pins.

As noted above the second guide apertures 70, 76 in the side plates 64, 66 are slot shaped. A slot shaped aperture, when the slot is oriented in the vertical direction and transverse the axial/longitudinal direction, permits a certain degree of vertical movement of the first leg 82 of the pin 80 when the pin 80 is located in the slot shaped aperture. Such movement may be important when the trailer 10 is moving over rough terrain and it begins to bounce or move in the vertical direction. In this condition, the main beam 30 may be moving up and down with respect to the axial/longitudinal direction and the first leg 82 of the pin 80 may move in the slot to accommodate the vertical movement. When the first leg 82 encounters the end of the slot, additional vertical movement of the main beam 30 is prevented.

As shown in FIGS. 4 and 5, the torsion bar 102 may be selectively located in the insert 90. In one embodiment, the second plurality of splines 110 on the torsion bar 102 are aligned with and engage with the first plurality of splines 100 in the insert 90 thus rotatably locking the torsion bar 102 to the insert 90. At the same time the torsion bar 102 is located through the insert 90, the torsion bar 102 also extends through the second guide apertures 146 in the secondary beam 116 to lock the main beam 30 and the secondary beam 116 together. Further, the key 112 on the end of the torsion bar 102 is located in a complimentary shaped aperture 78 in the main beam side surface 50, 52, 58, 60 or side plate 64, 66 thereon. The splines 100, 110, coupled with the key 112 in the aperture 78, enables the torsion bar 102 to resist rotation associated with the trailer 10 vertical movement.

While one embodiment of a torsion bar 102 is described, other devices may be permissible. Related structures may include elastomeric devices (such as constructed of rubber-like materials) and/or biasing members (such as springs, including coil or leaf type, or other types). These other structures may be used in place of the torsion bar 102, or in addition to the torsion bar 102. The other structures may be bar shaped or have different shapes and they may be unitary or they may be comprised of multiple pieces.

A locking pin 160 may be located through the apertures 94, 96 in the insert 90. The locking pin 160 may extend through or abut the torsion bar 102 to selectively fix it in place in the insert 90.

Through the above-described structure, the secondary beam 116 is securely connected to the main beam 30. The above structure affords some axial/longitudinal strength and support to the system 32, and it also resists vertical, or pivoting, motion of the main beam 30 with respect to the secondary beam 116. Such vertical, or pivoting, motion of the main beam 30 may be encountered when the trailer 10 is traversing rough or uneven ground.

In accordance with the provisions of the patent statutes, the present device and method has been described in what is considered to represent its preferred embodiments. However, it should be noted that the device and method can be practiced otherwise than as specifically illustrated and described without departing from its spirit or scope.

What is claimed is:

1. A system for connecting trailer towing components, comprising:
   a pin having a first leg and a second leg,
   a torsion bar having a first set of splines,
   a main beam for a trailer, said main beam, comprising:
      an insert adapted to selectively receive said torsion bar therein, and
      at least one guide aperture adapted to selectively receive one of said pin legs therein,
   a secondary beam adapted to be selectively located at least partially within said main beam, said secondary beam having apertures adapted to receive at least one of said legs of said pin and said torsion bar.

2. The system of claim 1, wherein said pin is U-shaped with a central member connecting said first and second legs in a unitary, one-piece and integrally formed fashion.

3. The system of claim 1, wherein ends of said first and second legs of said pin are threaded, said pin having a generally circular cross-section.

4. The system of claim 3, wherein said first and second legs of said pin are located through apertures in a retention plate, and fasteners are secured to said threaded ends of said first and second legs to secure the plate the legs.

5. The system of claim 1, wherein said first and second legs of said pin are located through said at least one guide aperture and said secondary beam apertures that are aligned in said main beam and said secondary beam when said secondary beam is located at least partially within said main beam to selectively connect the main beam to the secondary beam.

6. The system of claim 5, wherein one of said at least one guide apertures in said main beam is a slot extending transverse a longitudinal direction of the beam, wherein one of said pin legs is adapted to vertically translate within said slot.

7. The system of claim 1, wherein a first end portion of said torsion bar has said first plurality of splines extending at least partially circumferentially about said first end portion, and a second end portion with a key having a non-cylindrical shape.

8. The system of claim 7, wherein said insert has a second plurality of splines adapted to mesh with said first plurality of splines of said torsion bar, said second plurality of splines extending at least partially on an inner circumference of said insert.

9. The system of claim 7, wherein said key on said torsion bar is adapted to be located in an aperture with a complementary shape to prevent rotation of said torsion bar within said aperture.

10. The system of claim 1, wherein an aperture in said torsion bar is adapted to
be
aligned with an aperture in said insert, wherein a bushing pin is located through said insert aperture and into said torsion bar aperture to selectively secure them together.

11. The system of claim 1, wherein said main beam has a hollow interior portion adapted to receive said secondary beam therein such that the main beam entirely surrounds a portion of the secondary beam located therein.

12. The system of claim 1, wherein an aperture in said main beam is slot shaped
and
an aperture in said secondary beam adapted to align with said slot shaped aperture is round.

13. The system of claim 1, wherein an aperture in the secondary beam adapted to receive a leg of said pin is located outside of said main beam when said secondary beam is located within said main beam.

14. The system of claim 1, wherein at least one ferrule is located about at least
one
leg of said pin.

15. The system of claim 1, wherein said torsion bar extends entirely through said main beam and said secondary beam when said secondary beam is located at least partially within said main beam.

16. The system of claim 1, wherein the first leg of said pin extends entirely
through
both of said beams when said secondary beam is located at least partially within said main beam, and the second leg of said pin only extends entirely through said secondary beam when said secondary beam is located at least partially within said main beam.

17. A system for connecting trailer towing components, comprising:
- a main beam for a trailer having first and second guide apertures, and a hollow interior portion, wherein said first guide aperture is adapted to receive an insert therein, said insert having a first plurality of splines, wherein said second guide aperture is a slot;
- a secondary beam adapted to be selectively located within the hollow interior portion of said main beam, said secondary beam having first, second and third guide apertures therein;
- a U-shaped pin having first and second legs, wherein said first leg is adapted to be selectively located in said slot of said main beam and also into said first guide aperture of said secondary beam, and wherein said second leg is adapted to be selectively located in said third guide aperture of said secondary beam to secure said main beam to said secondary beam; and
- a torsion bar having a second set of splines that selectively engage with said first plurality of splines, wherein said torsion bar is adapted to be selectively located in said second guide aperture of said secondary beam to secure said main beam to said secondary beam.

18. A system for connecting trailer towing components, comprising:
- a pin having a first leg and a second leg,
- a torsion bar having a first set of splines,
- a main beam for a trailer wherein said main beam is adapted to selectively receive said torsion bar therein, wherein said main beam has at least one guide aperture adapted to selectively receive one of said pin legs therein,
- a secondary beam adapted to be selectively located at least partially within said main beam, said secondary beam having apertures adapted to receive at least one of said legs of said pin and said torsion bar.

* * * * *